No. 876,077.
PATENTED JAN. 7, 1908.
E. L. McCLAIN.
HORSE PAD HOOK.
APPLICATION FILED MAR. 28, 1907.
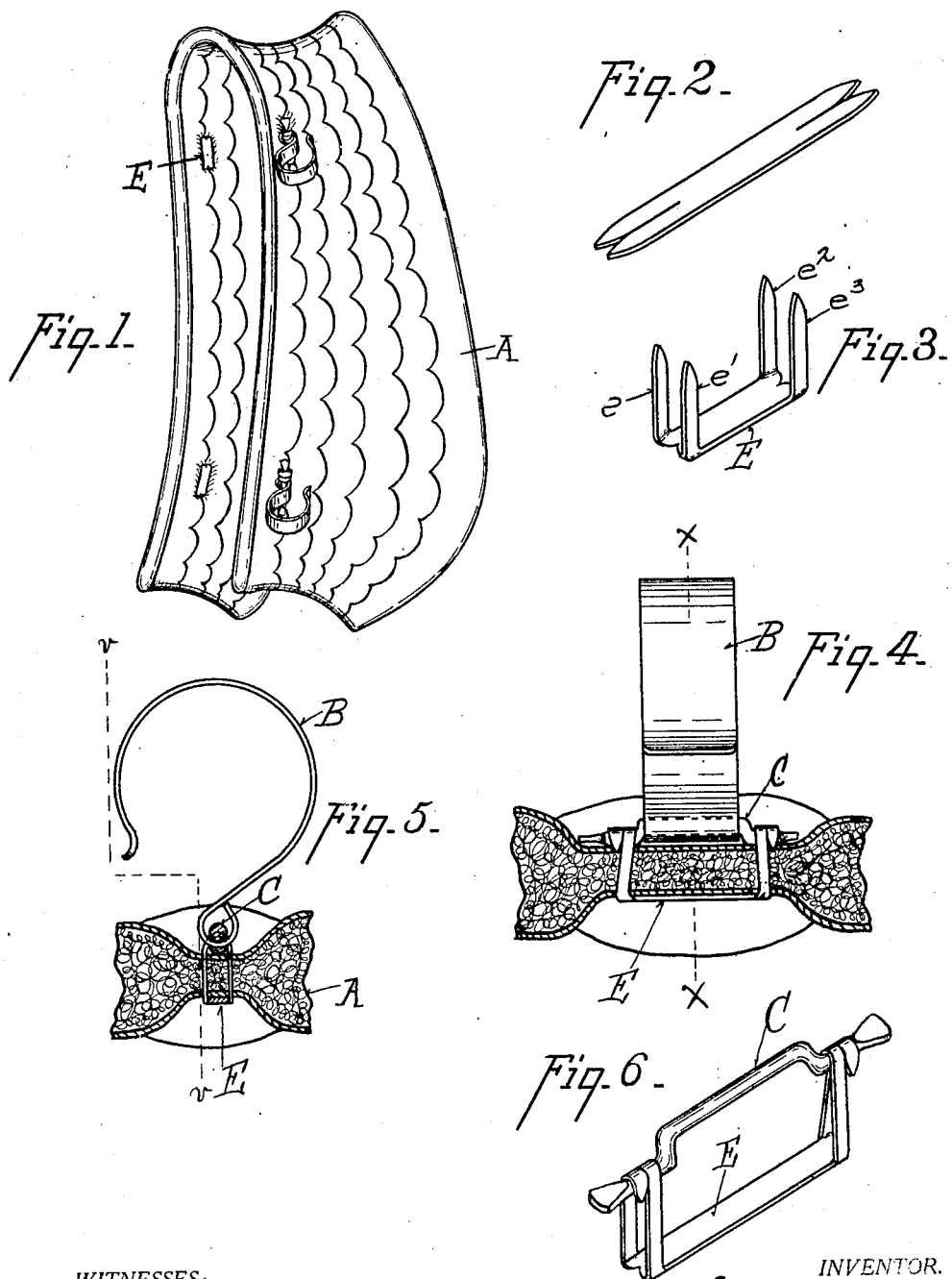
WITNESSES:
A. McCormack.
M. Groene.
INVENTOR.
Edward L. McClain
BY Walter F. Murray
ATTORNEY.

UNITED STATES PATENT OFFICE.

EDWARD L. McCLAIN, OF GREENFIELD, OHIO, ASSIGNOR TO THE AMERICAN PAD & TEXTILE CO., OF GREENFIELD, OHIO, A CORPORATION OF OHIO.

HORSE-PAD HOOK.

No. 876,077.  Specification of Letters Patent.  Patented Jan. 7, 1908.

Application filed March 28, 1907. Serial No. 365,177.

*To all whom it may concern:*

Be it known that I, EDWARD L. MCCLAIN, a citizen of the United States of America, and resident of Greenfield, State of Ohio, county of Highland, have invented certain new and useful Improvements in Horse-Pad Hooks, of which the following is a specification.

My invention relates to that class of hooks in which there is secured to the horse pad a hook plate, or bar, upon which the hook to engage the harness is journaled.

The object of my invention is a horse pad hook of this class, in which in use neither end of the hook bar will be pulled away from the pad but in which the hook bar will stand parallel to the surface of the pad.

Referring to the accompanying drawings, in which like parts are indicated by similar reference letters wherever they occur throughout the various views: Figure 1 is a perspective view of a horse collar pad supplied with the hook embodying my invention. Fig. 2 is a perspective view of the blank from which the preferred form of bar for use in combination with the hook bar is made. Fig. 3 is a perspective view of the bar made from the aforesaid blank. Fig. 4 is an enlarged sectional view taken upon line $v-v$ of Fig. 5. Fig. 5 is a view taken upon line $x-x$ of Fig. 4, but showing the hook in elevation. Fig. 6 is a perspective view of the bars and their connecting prongs.

In the drawings the invention is shown as applied to a collar pad A, but it may also be applied to other forms of horse pads. The hook, B, is journaled upon a hook bar, C, in the usual manner. The hook bar, C, is placed upon the outer surface of the pad. Upon the inner side of the pad opposite the hook bar, is placed a bar, E, with its ends bifurcated and turned into prongs, $e$, $e'$, $e^2$ and $e^3$, which are projected through the pad and have their outer ends curved over the opposite ends of the hook bar, C. With this arrangement it is seen that the strain brought upon the bar, C, by the hook, B, is carried by the prongs, $e$, $e'$, $e^2$ and $e^3$, to both ends of the plate, E. The pressure upon the hook, B, is therefore distributed equally by the plate, E, over the entire surface of the pad, beneath the plate, E. The bar, C, will therefore be maintained in parallelism to the surface of the pad and the ends of the hook bar, C, will not have a tendency to pull away from the pad. The hook, B, therefore, under strain tends to maintain its right-angled position to the surface of the pad and exerts a pressure which is equally distributed over a comparatively large area of the pad.

What I claim is:

1. The combination of a horse pad, a bar contacting with the inner side of the pad, a hook bar contacting with the outer side of the pad, two prongs extending from each end of the first bar through the pad around and bent over the ends of the hook bar, and a hook journaled upon the hook bar.

2. The combination of a horse pad, a hook bar upon the outer side of the pad, a hook journaled upon the hook bar, a bar upon the inner side of the pad and with its ends bifurcated and turned into prongs which project through the pad and engage the ends of the hook bar.

EDWARD L. McCLAIN.

Witnesses:
W. B. ADAMS,
DELLA SMALLEY.